(12) United States Patent
Correia et al.

(10) Patent No.: US 6,665,610 B1
(45) Date of Patent: Dec. 16, 2003

(54) METHOD FOR PROVIDING VEHICLE NAVIGATION INSTRUCTIONS

(75) Inventors: John J. Correia, Livonia, MI (US); Jeffrey M. Stefan, Clawson, MI (US)

(73) Assignee: General Motors Corporation, Detroit, MI (US)

(*) Notice: Subject to any disclaimer, the term of this patent is extended or adjusted under 35 U.S.C. 154(b) by 147 days.

(21) Appl. No.: 10/036,570

(22) Filed: Nov. 9, 2001

(51) Int. Cl.[7] .................. G01C 21/00; G06F 165/00
(52) U.S. Cl. .................. 701/209; 701/200; 701/206; 340/995.2
(58) Field of Search .................. 701/209, 200, 701/201, 206, 208, 213; 340/990, 995.2; 73/178 R

(56) References Cited

U.S. PATENT DOCUMENTS 5,515,283 A * 5/1996 Desai et al. ............... 701/200
5,893,898 A * 4/1999 Tanimoto ................... 701/201

\* cited by examiner

*Primary Examiner*—Thomas G. Black
*Assistant Examiner*—Arthur D. Donnelly
(74) *Attorney, Agent, or Firm*—Anthony Luke Simon

(57) ABSTRACT

The invention provides a method of determining vehicle navigation instructions to a destination from a closest main street intersection or freeway exit. A database consisting of latitude/longitude coordinates may be searched for the locations of the destination, all street intersections within a first radius of the destination, and all freeway exits within a second radius of the destination.

25 Claims, 10 Drawing Sheets

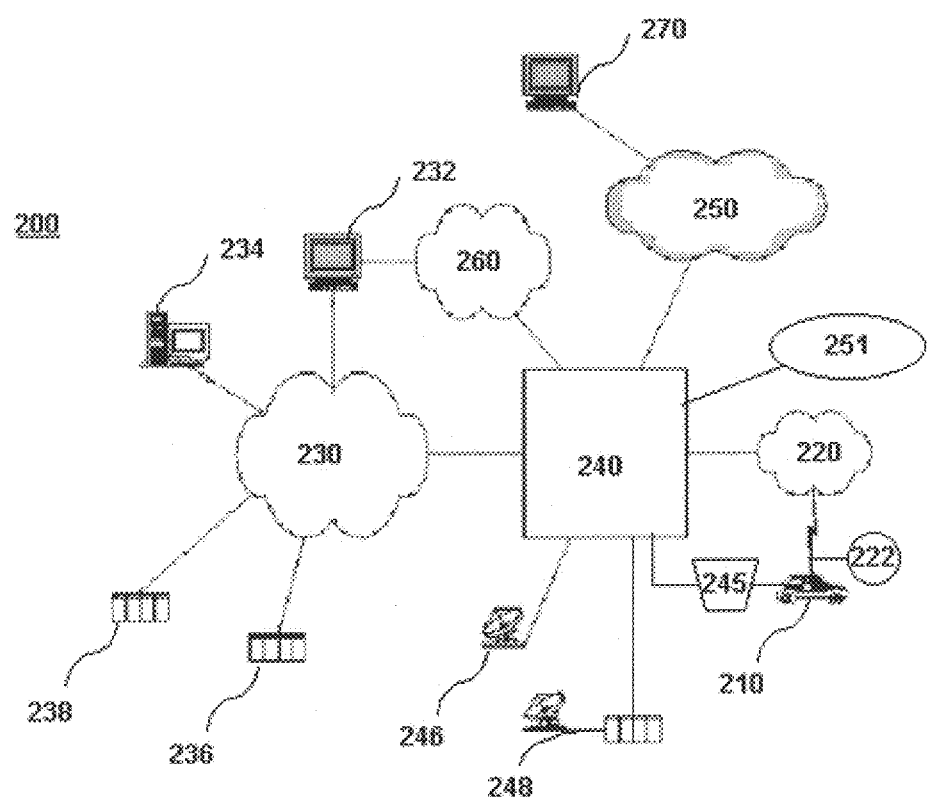

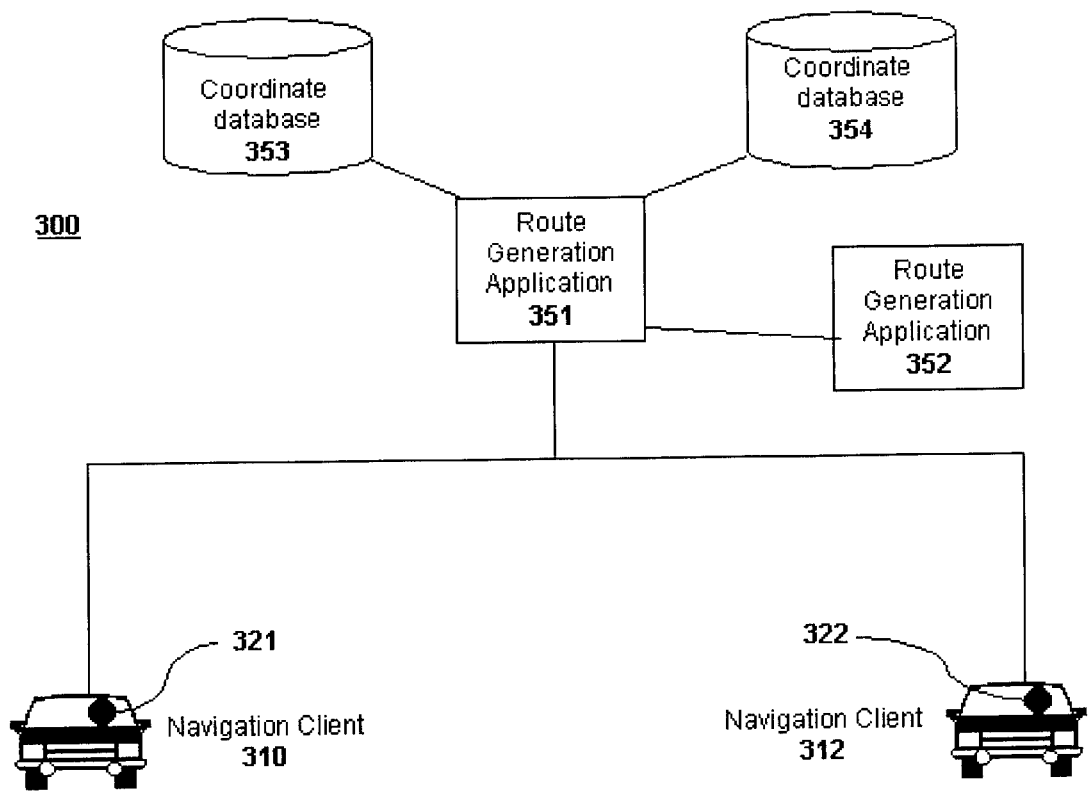

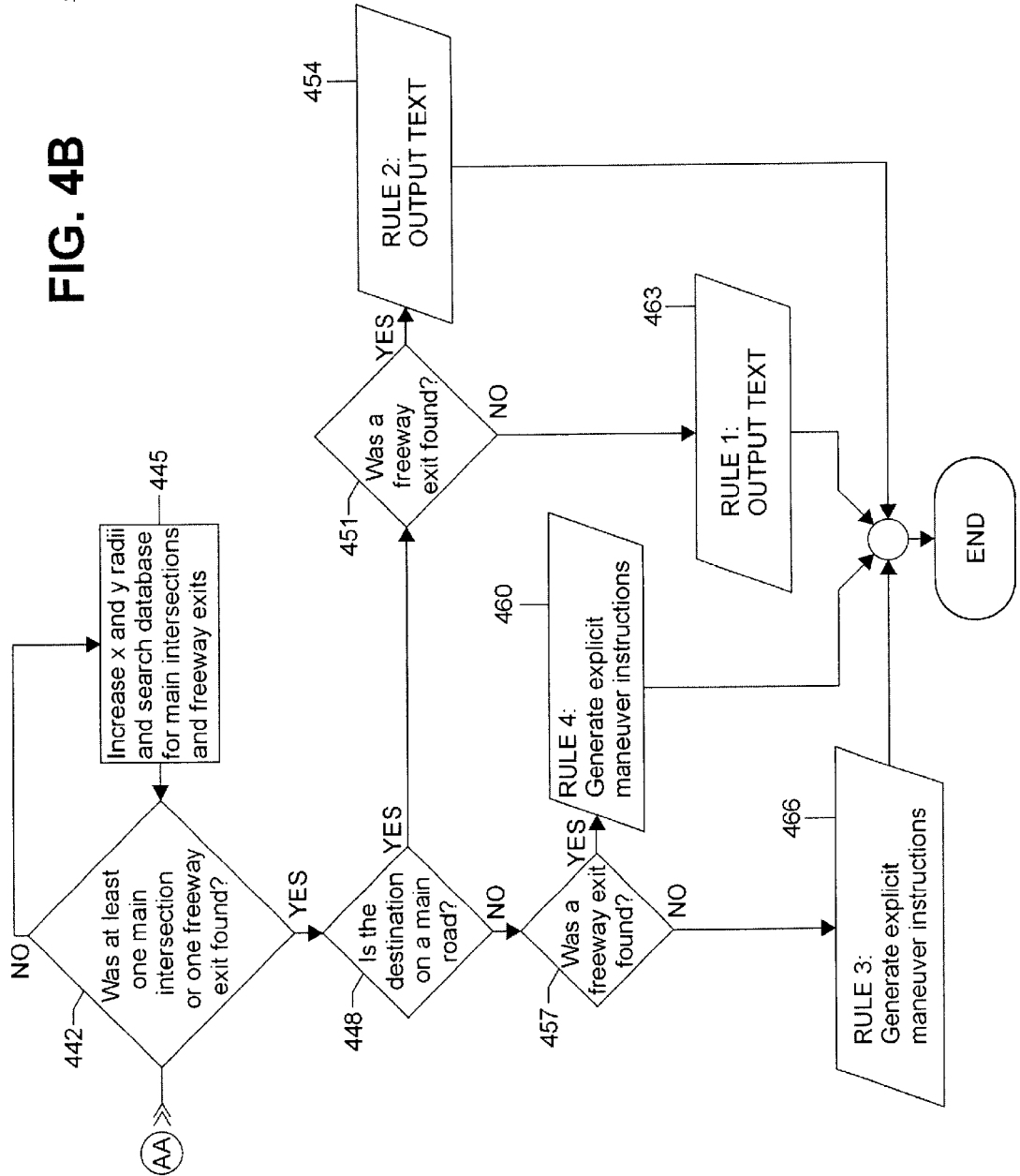

(503) Destination
(506) The x-radius extending from the destination
(509) The y-radius extending from the destination
(512) Closest main street intersection to the destination

- (603) Destination
- (606) x radius emanating from destination
- (609) y radius emanating from destination
- (612) Major cross-street intersection
- (615) Freeway exit (703) Destination
(706) x radius extending from destination
(709) y radius extending from destination
(712) Major cross street intersection (803) Destination    (806) x radius    (809) y radius (812) Highway

METHOD FOR PROVIDING VEHICLE NAVIGATION INSTRUCTIONS

FIELD OF THE INVENTION

In general, the invention relates to vehicle navigation. More specifically, the invention relates to a method of locating a given destination and in particular, to provide a brief summary of directions to a destination and location of a destination to a person who has some knowledge of the general geographical area.

BACKGROUND OF THE INVENTION

Current navigation systems require the user to input a starting point and a destination. Based on these two points, the navigation software accesses an existing map database, attempts to calculate the best route and provide detailed maneuvering instructions to meet the destination from the starting point.

Such detailed driving directions can be cumbersome, and a driver who may be familiar with the general area may only be interested in converting an address into a physical location. The driver may know approximately where the destination is located, and only require final maneuvers once the general area is reached. The driver may also possess additional information that is not included in the map database, such as areas of road construction to avoid for example, that may lengthen the trip.

Unable to take certain variables into account, many existing navigational systems may not return the fastest route. A system would be desirable that provides the precise physical location of the destination with respect to known landmarks, allowing the driver to navigate the best route. This method would reduce the number of calculations to be made and the amount of data required to be transmitted to the vehicle by utilizing the driver's existing knowledge base.

Thus, there is a significant need for a method for improving vehicle navigation so that physical address resolution can be more easily realized.

SUMMARY OF THE INVENTION

One aspect of the invention provides a method for providing vehicle navigation instructions. A system may include at least one database comprising of location coordinates. A destination may be received by the system and geocoded into a latitude/longitude location. The at least one database is searched to determine if at least one main intersection exists within a first radius extending from the destination. If at least one main street intersection exists within the first radius, the main intersection closest to the destination may be determined. The at least one database may also be searched to determine if at least one freeway exit exists within a second radius extending from the destination. If at least one freeway exit exists within the second radius, the freeway exit closest to the destination may be determined. Vehicle maneuver instructions may be provided from the closest intersection or the closest freeway exit or both.

Another aspect of the invention provides a method of increasing the first radius if a main intersection is not found within the first radius. The at least one database may be searched again using the new first radius.

Another aspect of the invention provides a method of increasing the second radius if no freeway exits are found within the second radius. The at least one database may be searched again using the new second radius.

Another aspect of the invention provides a method of converting the location of the destination into a user understandable format. The distance and direction of the destination from the closest intersection or freeway exit may be determined, and a sentence may be constructed based on the location of the destination and on the combination of existing intersections and freeway exits.

Another aspect of the invention provides a computer usable medium including a program for providing vehicle navigation instructions.

The program may include computer program code to receive the destination, computer code to calculate the at least one first radius and at least one second radius, computer code to search the database for main intersections and freeway exits, computer code to determine the distance between the destination and each main intersection and freeway exit, and computer code that increases either or both of the first radius and second radius independently.

The program may also contain computer code to determine a maximum first radius and a maximum second radius.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a schematic diagram of another embodiment of a system for generating navigation information for a vehicle in accordance with the present invention;

FIG. 3 is a schematic diagram of one embodiment of a navigation subsystem in accordance with the present invention;

DETAILED DESCRIPTION OF A PREFERRED EMBODIMENT

Figure 1:
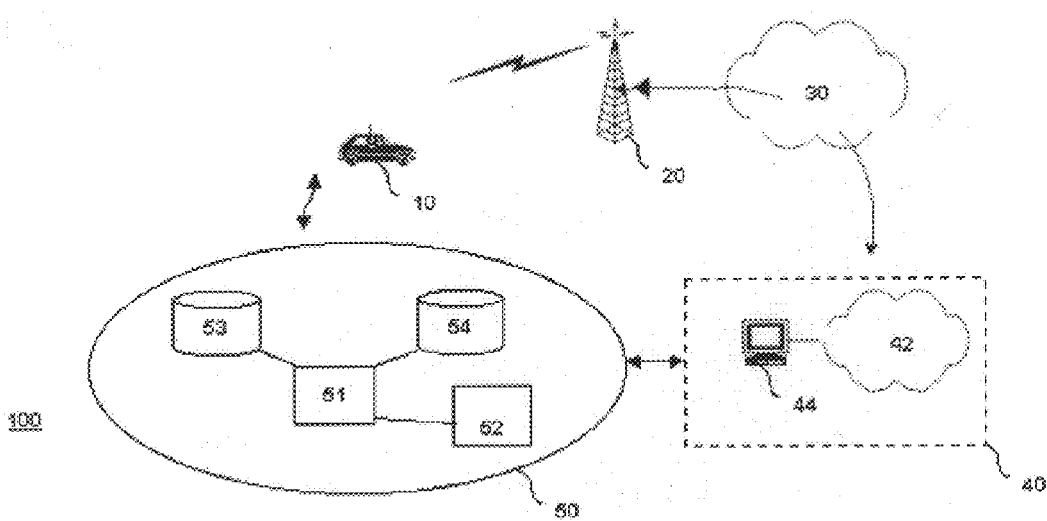
FIG. 1 is a schematic diagram of a system for generating navigation information for a vehicle in accordance with the present invention.

FIG. 1 shows one embodiment of a system for providing services to a vehicle in accordance with the present invention at 100. The system 100 may include one or more vehicle clients 10, one or more carrier systems 20, one or more communication networks 30, one or more service management subsystems 40 and one or more navigation subsystems 50. The service management subsystems may comprise one or more service management applications 42 and one or more service managers 44. The navigation subsystems 50 may comprise one or more route applications 51, 52, and one or more coordinate databases 53, 54.

Navigation subsystem 50 is a system for generating routes to be delivered to vehicle client 10 and for receiving route information from vehicle client 10. Navigation subsystem 50 may be connected with or in communication with service management subsystem 40. Service management subsystem 40 may be used to manage the delivery of information to or from navigation subsystem 50 or to other parts of system 100. Routes may be delivered or information may be received via a live agent, such as a human advisor, or via a virtual agent, such as an interactive computer program.

Navigation subsystem 50 may be any suitable hardware or software configuration, or combination of hardware and software that is configured to generate a route, process route information or receive information from vehicle client 10. In one embodiment of the invention, navigation subsystem 50 comprises one or more route applications 51, 52 and one or more coordinate databases 53, 54. For example, route applications 51, 52 may be any suitable software application for generating route information or otherwise processing route information. Coordinate databases 53, 54 may be any suitable databases for storing route information, such as location coordinates.

Vehicle client 10 may be any suitable vehicle. For example, the vehicle may be an automobile or a passenger-carrying unit such as a bus or train. Alternatively, vehicle client 10 may be an occupant of the vehicle or any suitable client device contained in the vehicle. In one embodiment of the invention, vehicle client 10 is a mobile or portable device equipped to communicate with service management subsystem 40.

Carrier system 20 is any suitable system for transmitting a signal from vehicle 10 to service management subsystem 40. Carrier system 20 may also transmit a signal from service management subsystem 40 to vehicle client 10. In one embodiment of the invention, carrier system 20 is a wireless carrier system as is well known in the art. Carrier system 20 may be, for example, a transmitter/receiver unit attached to vehicle client 10. Alternatively, carrier system 20 may be a separate transmitter/receiver carried by vehicle client 10.

Communication network 30 is any suitable system for communicating between vehicle client 10 and service management subsystem 40. In one embodiment of the invention, communication network is a public switched telephone network (PSTN). Alternatively, communication network 30 may be a multiprotocol Internet or intranet capable of transmitting voice and/or data in either analog or digital form or a combination of both. Alternatively, communication network 30 may be a hybrid communication network or virtual network.

Service management subsystem 40 is a system for managing a variety of services to be delivered to or from vehicle client 10. In one embodiment of the invention, service management subsystem 40 manages services that are distributable over a variety of channels. For example, services may be delivered via a live agent, such as a human advisor, or via a virtual agent, such as an interactive computer program. The structure of service management subsystem 40 may enable services to be delivered in a uniform manner regardless of the channel used for delivery or of the service being delivered. Service management subsystem 40 may maintain a consistent subscriber experience and "look and feel" across the products being delivered across the service distribution channels enabled.

Service management subsystem 40 may be any suitable hardware or software configuration, or combination of hardware and software that is configured to standardize each service being delivered via the subsystem 40 and to standardize each channel of delivery. In one embodiment of the invention, service management subsystem 40 standardizes each service and channel using personalization information from vehicle client 10. Thus, service management subsystem 40 may have a common profile mechanism across the services being delivered independent of the service distribution channel (live agent, virtual agent, web channel, speech channel) and of the service (news, weather, sports, stocks, navigation instructions, etc.). In one embodiment of the invention, service management subsystem includes one or more application components 42 and one or more service managers 44. For example, application 42 may be any suitable software application for managing one or more services. Service managers 44 may be any suitable hardware and/or software configuration or structure for executing applications 42.

FIG. 2 shows another embodiment of a system for providing services to a vehicle in accordance with the present invention at 200. Vehicle-directed service system 200 may include a subscriber 210 and a service management application 240. In the embodiment shown in FIG. 2, the service management subsystem may be in connection with a communication network 230, such as the Internet. Service management application 240 may also be in communication with service applications or other service management subsystems. For example, in FIG. 2, service management subsystem 240 is also in communication with a subsystem for processing route information shown at 251. Service management subsystem 240 may also be in communication with a web-based service application or other web-based service management systems or web servers. For example, in FIG. 2, service management application 240 is in communication with a web channel 260.

In one embodiment of the invention, service management application may include an in-vehicle component 245. This in-vehicle component may be located in, or on or may be in communication with vehicle client 210. In one embodiment of the invention, the in-vehicle component 245 may install a software algorithm, based on the type of call originated through a voice command, in order to optimize the talk path to subscriber management application 240. System 200 may also allow the subscriber to connect to a live administrator or advisor 270 through a spoken command acknowledged through the subscriber management application 240 voice user interface (VUI).

In one embodiment of the invention, subscriber 210 may have VUI access 222 through a PSTN 220. This may serve as the primary end user interface to service management application 240. This VUI access may allow subscribers in their vehicles equipped in accordance with the present invention to access a variety of services. For example, subscribers 210 may request route information or travel information or may provide information about their route, using voice commands in a conversational manner. Furthermore, the subscriber may have the ability to interrupt or suspend the session if required. In one embodiment of the invention, connections are made to the service management application 240 through the public telephone system. In one embodiment of the invention, subscriber 210 may gain audio access to subscriber management application 240 by activating an in-vehicle speech recognition application. This speech recognition application may allow the subscriber to place hands-free cell phone calls.

Subscriber 210 may also have graphical user interface (GUI) access 232 through a communication network 230, such as the Internet. Such an interface may allow subscribers to access a variety of Internet and communication network-based services in accordance with the present invention. For example, subscriber 210 may access email via this interface. In one embodiment of the invention, subscribers connect to the service management application 240 through the Internet 230 using standard Web browsers.

Subscriber 210 may also have GUI access through a web channel 260. This interface may be used by subscribers to access a variety of services. For example, subscriber 210 may maintain one or more user profiles using web channel 260. Subscriber 210 may also set up user-related rules such as e-mail consolidation and filtering rules. This interface may also be used to access selected content services. Vehicle data, such as diagnostic codes and messages, can be consolidated and displayed using web channel 260. As with other components of system 200, information entered or accessed via web channel 260 may then be incorporated into new products and services for presentation over other channels in communication with service management subsystem 240. The subscribers 210 may connect to the web channel 260 using standard Web browsers. In one embodiment of the invention, standard web channel software interacts with the service management application to update subscriber profiles and/or to obtain information of interest. In one embodiment of the invention, the web channel 260 interface uses a dedicated connection to the service management system 240.

System 200 may also include one or more administrators 270. Administrator 270 may use GUI access to manage service management system 240 and information related to system 200. Administrator 270 may be, for example, a live advisor available to advise subscriber 210. Administrator 270 may also be, for example, an individual maintaining or administering service management subsystem 240. In one embodiment of the invention, administrator 270 accesses service management subsystem 240 via subscriber management subsystem 250. For example, administrator 270 may send configuration and subscriber information to service management system 240. Administrator 270 may also receive notifications of interesting events within system 200. In one embodiment of the invention, subscriber management subsystem 250 uses a dedicated connection between administrator 270 and service management system 240.

As seen in FIG. 2, system 200 may also include one or more message servers 234. These messages may be, for example, voice or text or e-mail mail messages. In one embodiment of the invention, message servers 234 communicate with service management application 240 via Internet 230. Thus, subscribers 210 may receive incoming email messages from, and send outgoing e-mail messages to, external mail transport agents using any suitable messaging protocol as is well known in the art. Message servers 234 may also be used to retrieve subscribers' e-mail from outside mail storage servers for consolidation into their e-mail accounts connected to system 200.

As seen in FIG. 2, system 200 may also include one or more news and or sports feeds 236. In one embodiment of the invention, feeds 236 are provided by a network news content provider. Feeds 236 may be used to receive and store audio news and sports stories for playback to interested subscribers 210. The primary interface between the speech channel and news content provider 236 may be via the Internet 230. In one embodiment of the invention, a satellite feed 246 serves as a backup mechanism.

As seen in FIG. 2, system 200 may also include one or more weather services 248. In one embodiment of the invention, the services are provided by any suitable weather reporting service. Weather services 248 may be used to receive and store regional and local weather information for playback to interested subscribers 210. Furthermore, the weather content can be delivered based on the vehicle location by coordinating the weather zone with the vehicle GPS location. The weather service 248 and/or content feed may be co-located with the service management system 240.

System 200 may also include one or more finance services 238. For example, stock quotes may be provided to the subscriber. Any suitable finance technology may be used to provide these services to interested subscribers. In the embodiment of FIG. 2, the finance information is obtained at the time of the request through Internet attached content sources or dedicated connections 230 as is known in the art.

System 200 may also include other services to be delivered in addition to news, weather, sports and finance services as described above. For example, yellow pages listings, special interest content (e.g., movie or restaurant reviews), content related to the location of the vehicle (e.g. travel profiles of nearby tourist attractions) or content related to navigation of the vehicle may all be delivered via system 200.

FIG. 3 shows one embodiment of a navigation system in accordance with the present invention at 300. Navigation system 300 may include one or more navigation clients 310, 312. Each navigation client 310, 312 may have an in-vehicle navigator 321, 322. Navigation system 300 may also include one or more route generation applications 351, 352. Navigation system 300 may also include one or more coordinate databases 353, 354.

Navigation clients 310, 312 may be one or more vehicle clients as described above.

In-vehicle navigator 321, 322 may be any suitable component of navigation client 310, 312 which may be used to navigate vehicle client 310. 312. For example, in-vehicle navigator 321, 322 may be a driver. Alternatively, in-vehicle navigator 321, 322 may be an automatic system for navigating vehicle 310, 312.

Route generation applications 351, 352 may be any suitable application for calculating maneuver lists of directions between one or more locations. For example, route generation applications 351, 352 may be any suitable software or hardware programs for managing or calculating routes, portions of route or route coordinates. Route generation applications may include or be able to calculate routes from navigation client's current location to private residences, businesses or recreational facilities. In one embodiment of the invention, route generation applications 351, 352 are in communication with coordinate databases 353, 354.

Route generation applications 351, 352 may generate navigation information in any suitable manner. For example, route generation applications 351, 352 may generate routes using geocoding. That is, the application 351, 352 determines a corresponding latitude and longitude based on an input navigation address. Alternatively, route generation applications 351, 352 may generate routes using reverse geocoding. That is, the application 351, 352 determines a corresponding navigation address based on input latitude and longitude coordinates.

Coordinate databases 353, 354 may be any suitable databases for storing such location coordinates as latitude and longitude of a variety of locations. These locations may be, for example, points of interest. Coordinate databases 353, 354 may also be a database of street addresses. Coordinate databases 353, 354 may also be a database of routes between points.

Figure 4A:
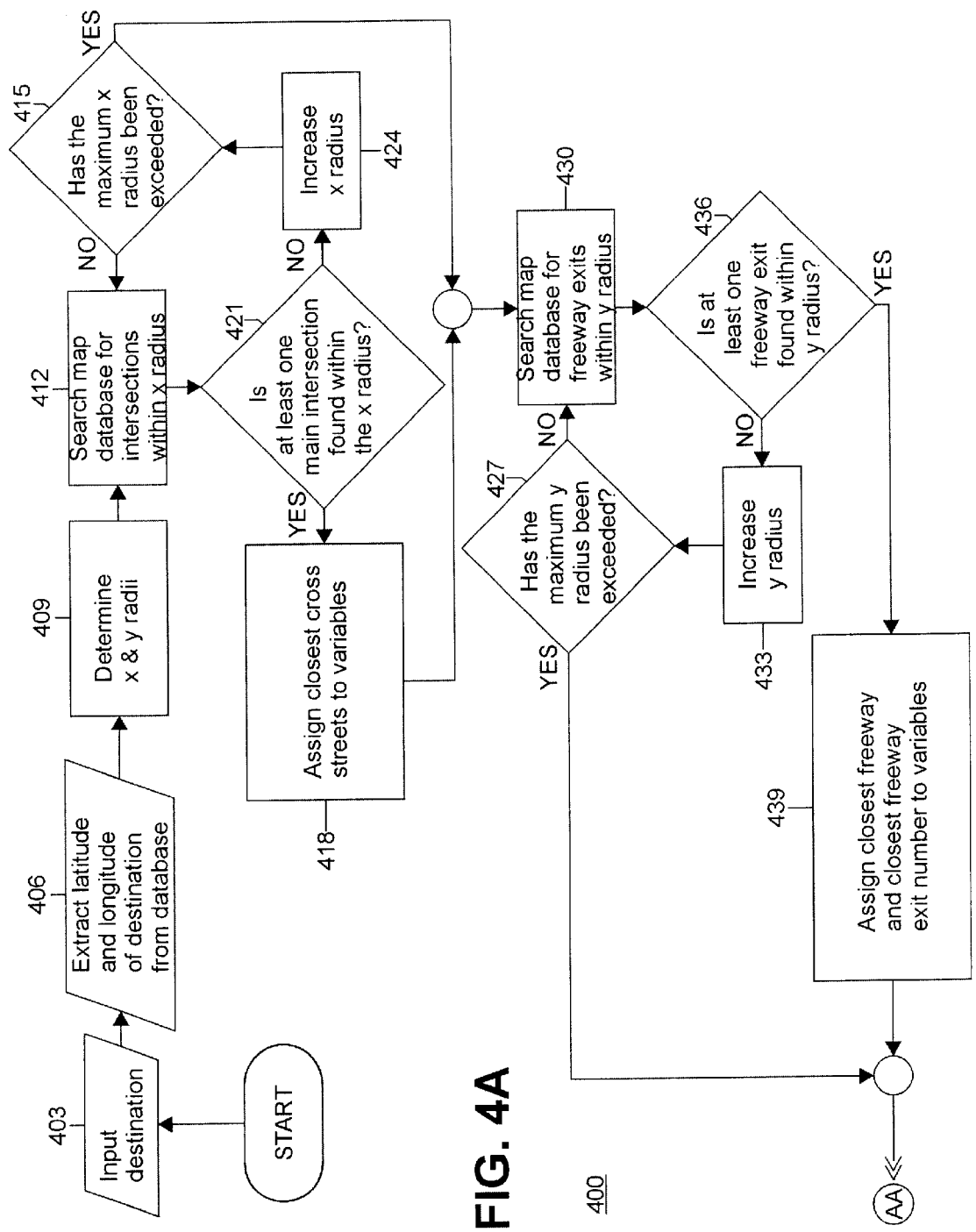
FIG. 4 is a flow chart of a preferred embodiment of a vehicle navigation algorithm in accordance with the present invention.

In FIG. 4, a method for providing vehicle navigation instructions 400 is illustrated in accordance with one embodiment of the present invention. As shown in FIG. 4, a destination is input to the system 403 by the vehicle client 10, 210, transmitted by the at least one communication network 30, 230 over the at least one carrier system 20, and received by the at least one navigation subsystem 50, 251 through the at least one service management subsystem 40, 240. A search may be performed on at least one database 53, 54 for the destination address. The database 53, 54 may return the geographical latitude and longitude of the destination 406 to the route generation application. The locations of the vehicle and destination may be used by the route application 51, 52 to determine vehicle direction. Two radii, x and y, extending outward from the destination may be determined. The length of the radii may be based on road speed, road density, road type, and other road related criteria 409. Alternatively, in one embodiment, either or both of the two radii may be determined based on a user profile. The x radius may be used to search for main street intersections within a given distance from the destination 412. The y radius may be used to search for freeway exits within a given distance from the destination 430.

The at least one database 53, 54 may be searched for all street intersections within a distance equal to the x radius from the destination. If at least one main intersection is not found within the x radius, the x radius is increased outward 424 from the destination and the search may be performed again for street intersections within the new x radius. If at least one main street intersection is found 421, the two streets forming the intersection closest to the destination may be assigned variables identifying the north/south street 418 and the east/west street 418. A maximum radius may be set extending the x radius 415. In one embodiment, the maximum radius may be based on a user profile or variables such as road speed, road density, road type, or other road related criteria.

The at least one database 53, 54 may be searched for all freeway exits within a distance equal to the y radius from the destination 430. If at least one freeway exit is not found within the y radius 436, the y radius may be increased outward from the destination 433 and the search may be performed again for freeway exits within the new y radius. If at least one freeway exit is found, the closest exit to the destination and it's corresponding exit number may be assigned to variables identifying the closest freeway exit and exit number 439. A maximum radius may set for extending the y radius 427. In one embodiment, the maximum radius may be based on, for example, a user profile or variables such as road speed, road density, road type, or other road related criteria.

In the event that both the x radius and the y radius have been extended past their maximum radii and a main intersection or freeway exit has not been found 442, both the x and y radii may be increased and the database 53, 54 searched again until at least one main intersection or freeway exit is found 445.

Once a main intersection or freeway exit has been found, instructions may be provided to the vehicle client 10. These instructions provide directional information for travel between the main intersection or freeway exit and the final destination. The variables assigned to the main intersection or freeway exit may be used to create these instructions.

In one embodiment, these variables (shown in capital letters) may be defined as:

DISTANCE=distance of the intersection or freeway exit from the destination in miles or kilometers DIRECTION=North, South, East, West, Northeast, Northwest, Southeast, and Southwest FREEWAY=freeway name FREEWAY_EXIT_NUMBER=freeway exit number STREET=street name where the destination is located CROSS_STREET1=main intersection's East/West cross street CROSS_STREET2=main intersection's North/South cross street Using the assigned variables, the instructions provided to the user may be presented in a grammar frame notation sentence structure. Two basic grammar frames reveal whether or not the destination is located on a main street 448, and whether a freeway exit was found within the y radius 451, 457. Grammar frame one provides the distance and the direction of travel towards the destination from a freeway exit in the form: DISTANCE DIRECTION of FREEWAY exit number FREEWAY_EXIT_NUMBER. Grammar frame two provides the distance and the direction of travel toward the destination from a main street intersection in the form: DISTANCE DIRECTION of CROSS_STREET1 and CROSS_STREET2 on STREET.

Four basic grammar frame notation rules may be used to determine how the instruction sentence structure may be presented to the user.

Rule one 463 may be used if the destination is located on a main street and a freeway exit is not found within the final y radius. In such a case only grammar frame two may be presented to the user. In this case, the output for rule one may be:

DISTANCE DIRECTION of CROSS_STREET1 and CROSS_STREET2 on STREET.

Rule two 454 may be used if the destination is located on a main street and a freeway exit is found within the y radius. In this case both grammar frame one and grammar frame two may be presented to the user as follows:

DISTANCE DIRECTION of CROSS_STREET1 and CROSS_STREET2 on STREET

DISTANCE DIRECTION of FREEWAY exit number FREEWAY_EXIT_NUMBER

Rule three 466 may be used if the destination is not located on a main street and a freeway exit is not found within the y radius. In one embodiment explicit maneuver instructions from the closest main intersection to the destination may be generated and output to the vehicle client.

Rule four 460 may be used if the destination is not located on a main street and a freeway exit is found. In such a case maneuver instructions from the freeway exit to the destination may be generated and output to the vehicle client.

Figure 5:
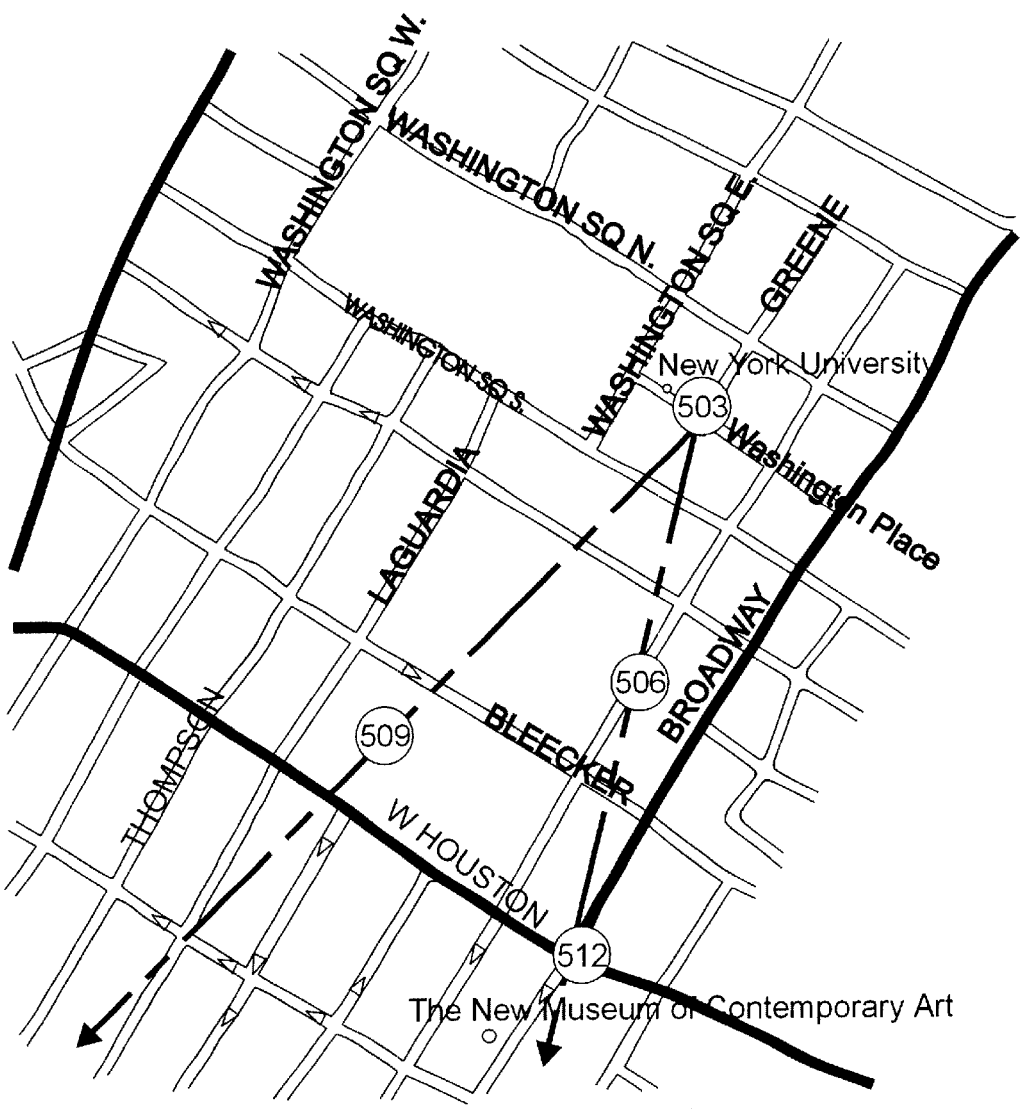
FIG. 5 is a map diagram illustrating a situation in which a main intersection is found within the x radius, but no freeway exit is found within the y radius in accordance with the present invention.

FIG. 5 shows a map diagram illustrating an example in which grammar frame notation rule one may be implemented. The destination 503 is located on Washington Place, which is a main street but not located at a main intersection. An x radius 506 extends from the destination to provide an area in which to search inside for main intersections. A y radius 509 extends from the destination to provide an area in which to search for freeway exits. The main intersection of Broadway and W Houston 512 is found within the x radius but no freeway exits are found within the y radius. The destination is calculated to be 0.41 miles Northwest of the main intersection of Broadway and W Houston. Grammar frame notation rule one may be presented because the destination is not located on a main street and no freeway exits are found. The variables may be assigned as follows:

DISTANCE=0.41 miles
DIRECTION=Northwest
FREEWAY=none
FREEWAY_EXIT_NUMBER none
STREET=Washington Place
CROSS_STREET1=W Houston
CROSS_STREET2=Broadway The following output would then be provided: "0.41 miles Northwest of Broadway and W Houston on Washington Place"

Figure 6:
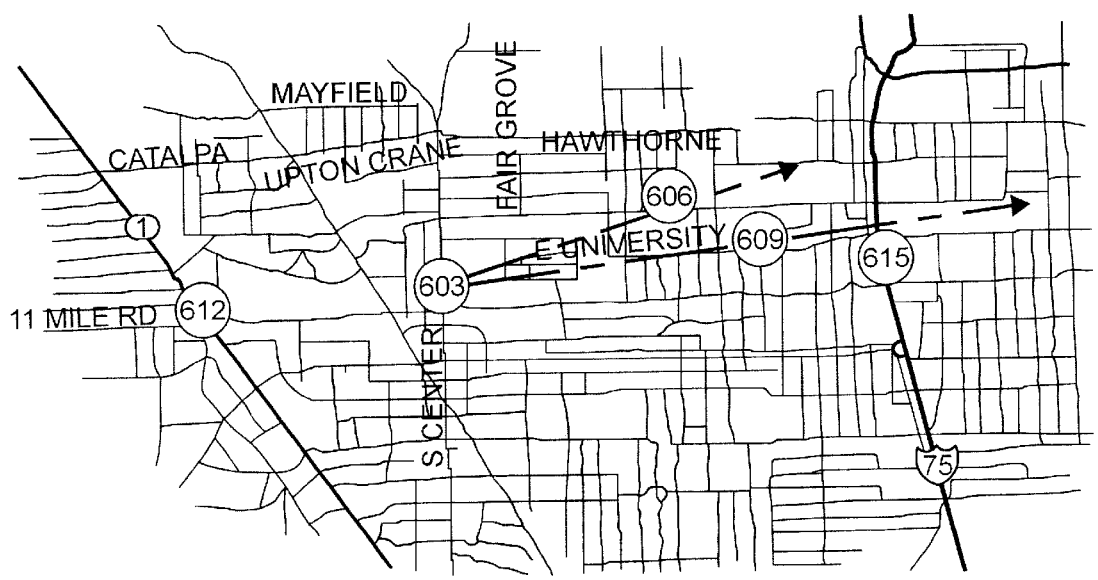
FIG. 6 is a map diagram illustrating a situation in which a destination is located on a main road, and a freeway exit is found within the y radius in accordance with the present invention.

FIG. 6 shows a map diagram illustrating an example in which grammar frame notation rule two may be implemented. The destination 603 is located on a main street. An x radius 606 is extended from the destination to provide an area to search for main intersections, and the intersection of 11 Mile Road and US1 is found to be the closest 612 at 0.6 miles West of the destination, placing the destination to the East of the intersection. A y radius 609 is extended from the destination to provide an area to search for freeway exits, and I-75 exit number 107 615 is found to be the closest. I-75 is located 1.6 miles to the East of the destination, placing the destination to the West of the vehicle. Grammar frame notation rule two may be presented because the destination is located on a main street and a freeway exit was found within the y radius. Given the following assigned variables, the outputs shown inside quotation marks may be provided:

DISTANCE=1.6 miles
DIRECTIO=West
FREEWAY=I-75
FREEWAY_EXIT_NUMBER=107
Grammar frame one: "1.6 miles West of I-75 exit number 107"
DISTANCE=0.6 miles
STREET=S Center
CROSS_STREET1=11 Mile Rd
CROSS_STREET2=US1
Grammar frame two: "0.6 miles East of US1 and 11 Mile Rd on S Center"

Figure 7:
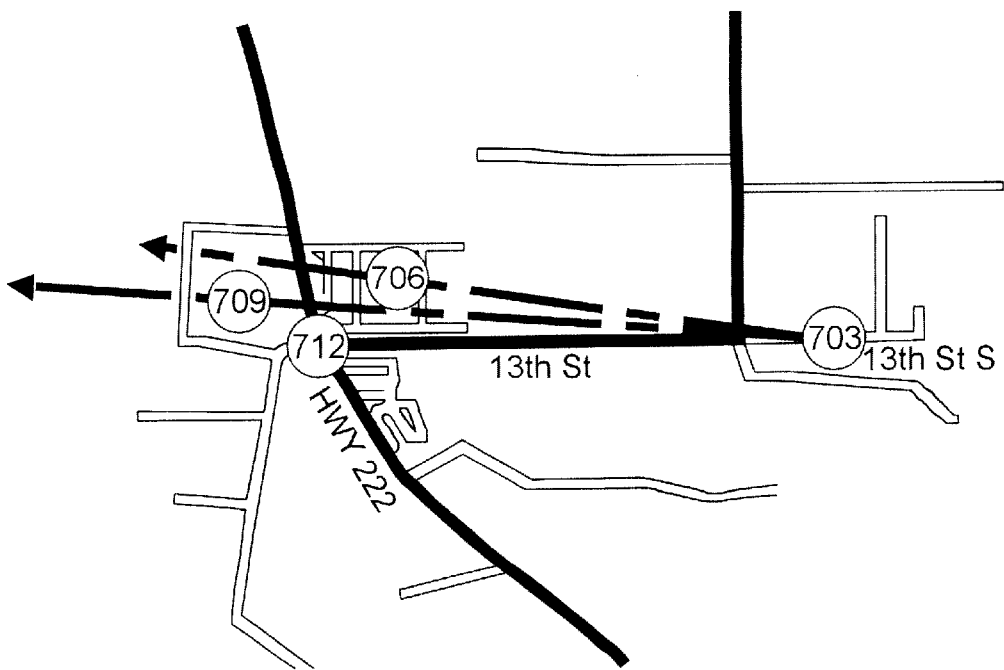
FIG. 7 is a map diagram illustrating a situation in which a destination is not located on a main road and a freeway exit is not found within the y radius in accordance with the present invention.

FIG. 7 shows a map diagram illustrating an example in which grammar frame notation rule three may be implemented. The destination 703 is not located on a main street. An x radius 706 is extended from the destination to provide an area to search for main intersections, and the intersection of $13^{th}$ St S and Hwy 222 is found to be the closest 712 at 0.43 miles West of the destination, placing the destination to the East of the intersection. A y radius 709 is extended from the destination to provide an area to search for freeway exits, but no freeway exit is found within the y radius. Grammar frame notation rule three may be presented because the destination is not located on a main street and no freeway exits were found within the y radius. Rule three specifies that explicit maneuver instructions from a main intersection may be provided. Variables may be assigned as follows:

DISTANCE=0.43 miles
DIRECTION=East
FREEWAY=none
FREEWAY_EXIT_NUMBER=none
STREET=$13^{th}$ St S service drive
CROSS_STREET1=$13^{th}$ St S
CROSS_STREET2=Hwy 222

The following maneuver instructions may be provided: "Drive 0.43 miles East of the intersection of HWY 222 and $_{13}$th St S. Continue on $13^{th}$ St S for 0.1 miles on $13^{th}$ St S service drive."

Figure 8:
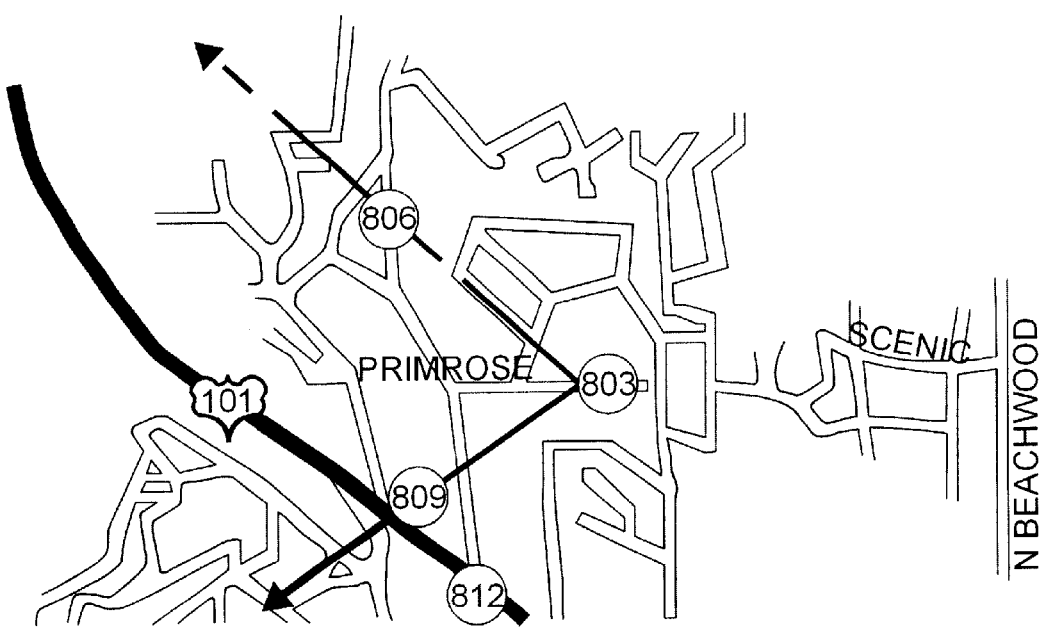
FIG. 8 is a map diagram illustrating a situation in which a destination is not located on a main road, and a freeway exit is found within the y radius in accordance with the present invention.

FIG. 8 shows a map diagram illustrating an example in which grammar frame notation rule four may be implemented. The destination 803 is not located on a main street. An x radius 806 is extended from the destination to provide an area to search for main intersections, but no main intersection is found. A y radius 809 is extended from the destination to provide an area to search for freeway exits, and US 101 exit 15 North is found to be closest 812. Grammar frame notation rule four may be presented because the destination is not located on a main street and a freeway exit was found within the y radius. Rule four specifies that explicit maneuver instructions from a freeway exit may be provided.

Variables may be assigned as follows:
FREEWAY=Hollywood Fwy US 101
FREEWAY_EXIT_NUMBER=15 North
STREET=$13^{th}$ St S service drive
CROSS_STREET1=none
CROSS_STREET2=none The following maneuver instructions may be provided:
"Exit on the Hollywood Fwy US 101 exit 15 North."
"Go North on N. Beachwood. In 0.4 miles turn left on Scenic."
"In 0.5 miles turn right on Primrose Ave. Continue on Primrose Ave for 0.1 miles to 6305 Primrose."

Figure 9:
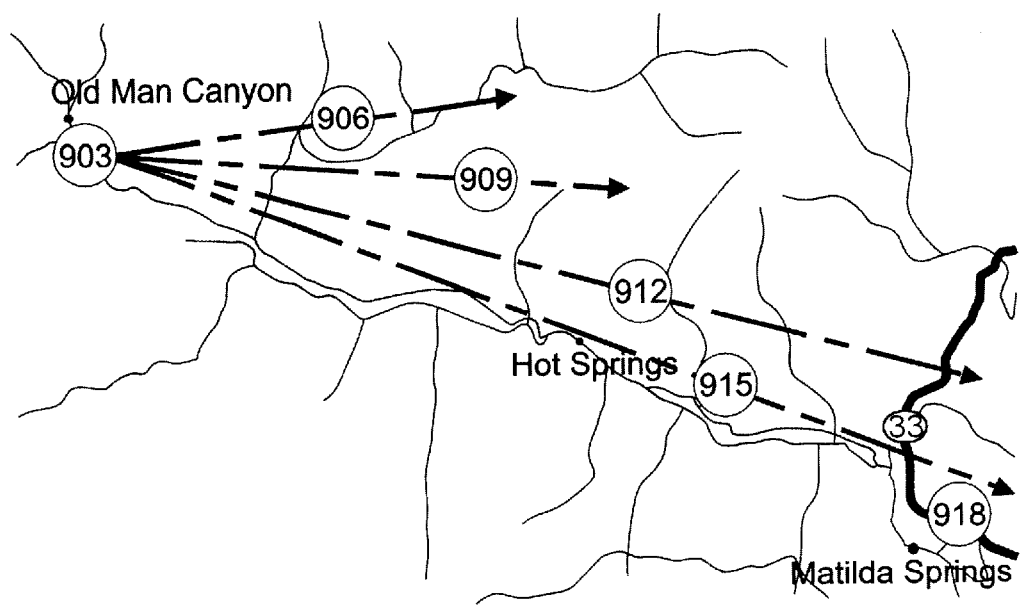
FIG. 9 is a map diagram illustrating a situation in which a destination is not located on a main road, and a freeway exit is found after extending the y radius in accordance with the present invention.

FIG. 9 shows a map diagram illustrating an example in which the x radius and y radius must be increased. No main intersection is found within the initial x radius 906 and no freeway exit is found within the initial y radius 909 extending from the destination 903. The x radius is increased 912 to provide a greater area to search for main intersections and the y radius is increased 915 to provide a greater area to search for freeway exits. The search within the new radii locates no main intersection but does locate a freeway exit. Grammar frame notation rule four may be presented because the destination is not located on a main street and a freeway exit 918 was found within the y radius. Rule four specifies that explicit maneuver instructions from a freeway exit must be provided.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of providing vehicle navigation instructions comprising:
   receiving a destination at a map database;
   determining whether at least one main street intersection exists within a first radius extending from the destination;
   if at least one main street intersection exists within the first radius, determining the main street intersection closest to the destination, and providing vehicle navigation instructions from the closest intersection to the destination;
   determining whether at least one freeway exit exists within a second radius extending from the destination; and
   if at least one freeway exit exists within the second radius, determining the closest freeway exit to the destination, and providing vehicle navigation instructions from the closest freeway exit to the destination.

2. The method of claim 1 further comprising:
   extending the first radius if at least one main street intersection does not exist within the first radius.

3. The method of claim 1 further comprising:
if at least one freeway exit does not exist within the second radius, extending the second radius.

4. The method of claim 1 further comprising:
converting all intersections and freeway exits found to be closest to the destination into a grammar frame notation according to a grammar frame notation rule base.

5. The method of claim 1 wherein receiving the destination comprises receiving a destination request and geocoding the destination request.

6. The method of claim 2 wherein providing vehicle navigation instructions comprises providing street names and direction of travel on each street to reach the destination.

7. The method of claim 5 wherein geocoding a location comprises extracting latitude and longitude coordinates for that location from a database.

8. The method of claim 3 wherein providing vehicle navigation instructions comprises providing street names and direction of travel on each street to reach the destination.

9. The method of claim 4 wherein converting to a grammar frame notation comprises:
determining the direction the destination may be located with respect to each intersection and freeway exit;
converting the direction information and distance information from the intersection or freeway exit into a user understandable sentence, based on the combination of closest intersections and closest freeway exits found.

10. The method of claim 4 wherein the grammar frame notation rule base comprises:
A set of rules corresponding to differing combinations of closest intersections and closest freeway exits found, that determines how the user understandable sentence may be constructed.

11. The method of claim 1 wherein a radius may be determined based on a user profile.

12. A computer usable medium for providing vehicle navigation instructions comprising:
computer readable code to receive a destination at a map database;
computer readable code to determine whether at least one main street intersection exists within a first radius extending from the destination;
if at least one main street intersection exists within the first radius, computer readable code to determine the main street intersection closest to the destination, and providing vehicle navigation instructions from the closest intersection to the destination;
computer readable code to determine whether at least one freeway exit exists within a second radius extending from the destination; and
if at least one freeway exit exists within the second radius, computer readable code to determine the closest freeway exit to the destination, and providing vehicle navigation instructions from the closest freeway exit to the destination.

13. The computer usable medium of claim 12 further comprising:
computer readable code to extend the first radius if at least one main street intersection does not exist within the first radius.

14. The computer usable medium of claim 12 further comprising:
extending the second radius if at least one freeway exit does not exist within the second radius.

15. The computer usable medium of claim 12 further comprising:
converting all intersections and freeway exits found to be closest to the destination into a grammar frame notation according to a grammar frame notation rule base.

16. The computer usable medium of claim 12 wherein receiving the destination comprises receiving a destination request and geocoding the destination request.

17. The computer usable medium of claim 12 wherein providing vehicle navigation instructions comprises providing street names and direction of travel on each street to reach the destination.

18. The computer usable medium of claim 12 wherein providing vehicle navigation instructions comprises providing street names and direction of travel on each street to reach the destination.

19. The computer usable medium of claim 16 wherein geocoding a location comprises extracting latitude and longitude coordinates for that location from a database.

20. The computer usable medium of claim 15 wherein converting to a grammar frame notation comprises:
determining the direction the destination may be located with respect to each intersection and freeway exit;
converting the direction information and distance information from the intersection or freeway exit into a user understandable sentence, based on the combination of closest intersections and closest freeway exits found.

21. The method of claim 15 wherein the grammar frame notation rule base comprises:
A set of rules corresponding to differing combinations of closest intersections and closest freeway exits found, that determines how the user understandable sentence may be constructed.

22. A system of providing vehicle navigation instructions comprising:
means for receiving a destination at a map database;
means for determining whether at least one main street intersection exists within a first radius extending from the destination;
if at least one main street intersection exists within the first radius, means for determining the main street intersection closest to the destination, and providing vehicle navigation instructions from the closest intersection to the destination;
means for determining whether at least one freeway exit exists within a second radius extending from the destination; and
if at least one freeway exit exists within the second radius, means for determining the closest freeway exit to the destination, and providing vehicle navigation instructions from the closest freeway exit to the destination.

23. The method of claim 1 further comprising:
means for extending the first radius if at least one main street intersection does not exist within the first radius.

24. The method of claim 1 further comprising:
means for extending the second radius if at least one freeway exit does not exist within the second radius.

25. The method of claim 1 further comprising:
means for converting all intersections and freeway exits found to be closest to the destination into a grammar frame notation, according to a grammar frame notation rule base.

* * * * *